(12) United States Patent
Kikuchi et al.

(10) Patent No.: US 6,472,780 B2
(45) Date of Patent: Oct. 29, 2002

(54) ROTATING ELECTRICAL MACHINE

(75) Inventors: Toshio Kikuchi, Yokosuka (JP); Shinichiro Kitada, Tokyo (JP); Yutaro Kaneko, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/971,183

(22) Filed: Oct. 5, 2001

(65) Prior Publication Data
US 2002/0067086 A1 Jun. 6, 2002

(30) Foreign Application Priority Data
Nov. 21, 2000 (JP) .......................... 2000-353869

(51) Int. Cl.$^7$ ................................. H02K 9/00
(52) U.S. Cl. ........................... 310/52; 310/216
(58) Field of Search ................. 310/52, 54, 58, 310/216, 217, 64, 218

(56) References Cited

U.S. PATENT DOCUMENTS

| | | | | |
|---|---|---|---|---|
| 2,845,551 A | * | 7/1958 | Potter ........................... | 310/54 |
| 3,221,195 A | * | 11/1965 | Hoffmann ..................... | 310/179 |
| 3,652,889 A | * | 3/1972 | Reece et al. ................. | 310/217 |
| 3,787,744 A | * | 1/1974 | Saito ........................... | 310/217 |
| 4,330,726 A | * | 5/1982 | Albright et al. ............. | 310/254 |
| 4,564,779 A | * | 1/1986 | Terry, Jr. .................... | 29/596 |
| 6,222,289 B1 | * | 4/2001 | Adames ....................... | 310/54 |

FOREIGN PATENT DOCUMENTS

| | | |
|---|---|---|
| JP | 2716286 | 11/1997 |
| JP | 10-336966 | 12/1998 |

\* cited by examiner

*Primary Examiner*—Nestor Ramirez
*Assistant Examiner*—Hanh Nguyen
(74) *Attorney, Agent, or Firm*—Foley & Lardner

(57) ABSTRACT

A rotating electrical machine is proposed which effectively cools a stator and prevents the generation of an eddy current in the stator. A cooling liquid passage extends in a direction parallel with the rotating shaft of the rotor between an outer peripheral face of the stator cores and an inner peripheral face of the case storing the stator cores. The cooling liquid is passed through the cooling liquid passage. In this manner, a highly effective cooling results from direct contact of the cooling liquid and the stator cores. Furthermore an eddy current is not generated in the stator core as a result of using a cooling liquid having insulating properties.

10 Claims, 2 Drawing Sheets

ROTATING ELECTRICAL MACHINE

FIELD OF THE INVENTION

This invention relates to a rotating electrical machine which is used as either a motor or a generator, or both.

BACKGROUND OF THE INVENTION

Rotating electrical machines used in various types of vehicles are provided with a structure to cool a stator in order to suppress heat generated in the stator as a result of conduction in the stator coils. Tokkai Hei 10-336966 published by the Japanese Patent Office in 1998 discloses a structure which is provided with cooling liquid passages (through holes) passing through the stator in a direction parallel with the rotational axis of the rotor. The passages cool the stator by allowing flow of a cooling liquid, namely a cooling medium.

SUMMARY OF THE INVENTION

However this conventional structure entails the problems that it is difficult to form a cooling liquid passage which has a sufficiently large contact surface area with the stator to allow a strong cooling effect. The conventional technique entails the further problem that the cooling liquid passage hinders the flow of magnetic flux in the stator, and that machining the stator core is difficult due to forming the through holes.

It is therefore an object of this invention to provide a rotating electrical machine which performs effective cooling of a stator.

In order to achieve above object, this invention provides a rotating electrical machine having a rotor free to rotate about a rotating shaft, a stator comprising a stator core formed by laminating a plurality of magnetic steel plates in a direction parallel with the rotating shaft of the rotor and coils wound on the stator core, and the case storing the stator.

The rotating electrical machine comprising a cooling liquid passage defined by the outer peripheral face of the stator core and the inner peripheral face of the case, the cooling liquid passage extending parallel to the direction of the rotating shaft, wherein the stator core being cooled by passing a cooling liquid through the cooling liquid passage.

The details as well as other features and advantages of this invention are set forth in the remainder of the specification and are shown in the accompanying drawings.

DESCRIPTION OF THE PREFERRED EMBODIMENTS

Figure 1:
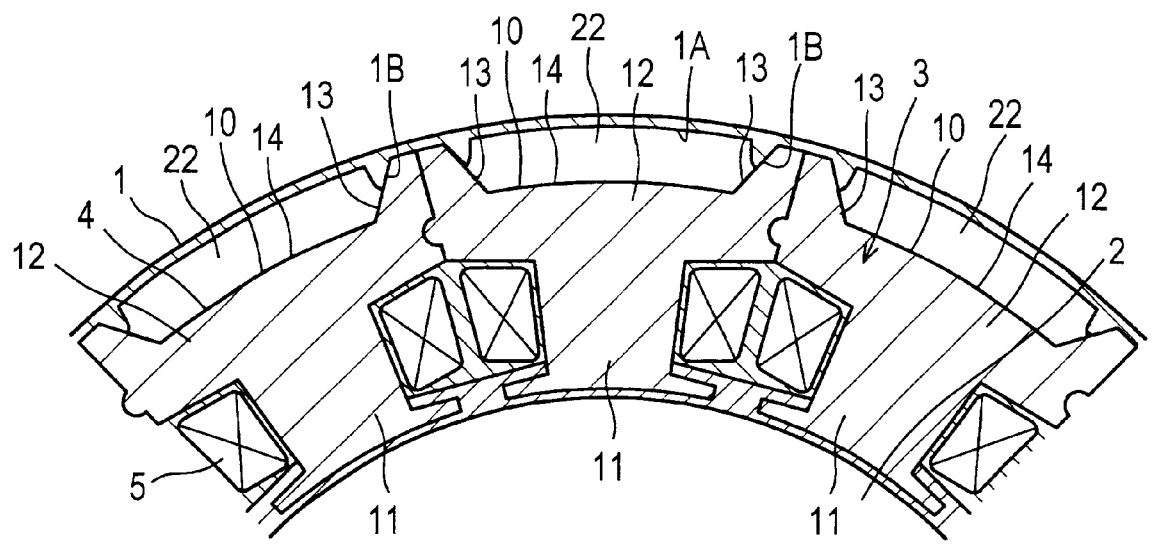
FIG. 1 is a partial sectional view of a rotating electrical machine according to a first embodiment of this invention.
Figure 1:
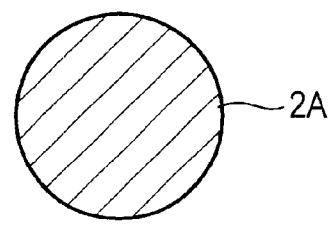

A rotating electrical machine according to a first embodiment of this invention will be described below with reference to FIG. 1.

A rotating electrical machine as shown in the figure comprises a rotor (rotating element) 2 and a stator (fixed element) 3 stored in a case 1. When the rotating electrical machine functions as a motor, the rotor 2 is rotated around the rotating shaft 2A by applying a current to the coils 5 of the stator 3. The center axis of the rotating shaft 2A substantially coincides with the rotation axis of the rotor 2. When the rotating electrical machine functions as a generator, a current is generated in the coils 5 by rotating the rotor 2. The stator 3 generates heat as a result of the current flowing in the coils 5.

The rotor 2 comprises a substantially cylindrical member and is mounted on the case 1 in a manner that it is freely rotated around the rotating shaft 2A. The rotating shaft 2A extends perpendicularly with respect to the surface of the figure.

The stator 3 comprises stator cores 4 and coils 5 wound on the stator cores 4, having an annular shape. The stator 3 is disposed on an outer periphery of the rotor 2 and is fixed to an inner peripheral face 1A of the case 1. In this embodiment, the stator 3 is preferably mounted to the case 1 by a method of shrink fitting.

The stator is formed from a plurality of magnetic steel plates 10. These magnetic steel plates 10 are formed substantially in the shape of a letter T with an insulating film coated thereon. The magnetic steel plates 10 are provided with teeth 11 on which coils 5 are wound. The teeth 11 extend in a radial direction towards the rotating shaft 2A.

Furthermore each magnetic steel plate 10 is provided with an end 12 which overhangs both sides of the teeth 11. A protrusion 13 which projects towards the case 1, namely, the opposite direction to the teeth 11, is formed on both lateral ends of the ends 12 of the magnetic steel plates 10. Adjacent protrusions 13 are dovetailed. In this manner, the magnetic steel plates 10 form a circular ring about the outer periphery of the rotor 2, each being dovetailed to the adjacent magnetic steel plates 10. Circular rings formed from the magnetic steel plates 10 are laminated in a direction parallel with the rotating shaft 2A of the rotor 2 in order to form the stator 3.

A cooling liquid is passed via cooling liquid passages 22 in order to suppress heat generation in the stator 3. A cooling liquid passage 22 is formed between the outer peripheral face of the stator core 4 and the inner peripheral face of the case 1. Thus, the cooling liquid passage 22 has a sufficiently large contact surface area with the stator 3. The cooling liquid passage 22 is defined by the inner peripheral face of the case 1 storing the stator 3 and the outer peripheral face of the stator cores 4, and extends in a direction parallel with the rotating shaft 2A of the rotor 2.

A section sandwiched by protrusions 13 defines an indentation 14 on the outer peripheral face of the magnetic steel plates 10. A cooling liquid passage 22 is formed by the inner peripheral face 1A of the case 1 and the indentation 14. Since the cooling liquid passage 22 is not provided in the interior of the stator core 4, the cooling liquid passage, of course, does not hinder the flow of magnetic flux in the stator.

Any type of cooling liquid may be used as long as it comprises a liquid having electrical insulation properties. Oil is preferentially used as a cooling liquid. Since the cooling liquid does not allow conduction of electricity, the laminated magnetic steel plates 10 are not electrically short-circuited. As a result, an eddy current between the magnetic steel plates does not result.

In this embodiment, the stator cores 4 are effectively cooled by direct contact with the cooling liquid as a result of passing the cooling liquid through the cooling liquid passage 22. Furthermore since the cooling liquid which is passed through the cooling liquid passage 22 comes into direct contact with the case 1, heat transmission to the case 1 is improved and it is possible to increase the heat radiation effect from the case 1. Forming the cooling liquid passage on an outer peripheral face of the stator core 4 facilitates machining the stator core 4.

A dovetail indentation 1B and a dovetail protrusion 13 comprise a dovetail section which fixes the stator core 4 and the case 1 in a peripheral direction. The protrusion 13 formed on the outer peripheral face of the stator core 4 is dovetailed to the indentation 1B formed on the inner peripheral face 1A of the case 1. By fixing dovetail protrusion 13 of the stator cores 4 to the dovetail indentation 1B of the case 1 in a peripheral direction in this manner, it is possible to prevent the stator cores 4 from moving in a peripheral direction with respect to the case 1 in reaction to torque for driving the rotor 2.

When the cooling liquid passage 22 is provided between the outer peripheral face of the stator core 4 and the inner peripheral face of the case 1, the section of contact of the stator core 4 with the case 1 is reduced. For this reason, a protrusion 13 and an indentation 1B are provided in this embodiment in order to dovetail the stator core 4 and the case 1. Thus it is possible to ensure fixation of the stator core 4 and the case 1 in a peripheral direction.

Figure 2:
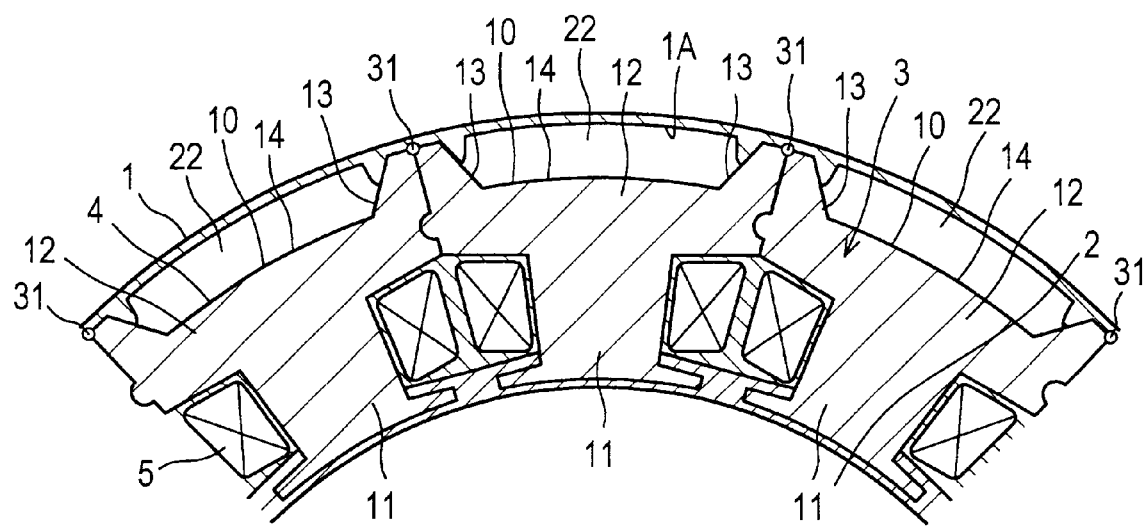
FIG. 2 is a partial sectional view of a rotating electrical machine according to a second embodiment of this invention.
Figure 2:
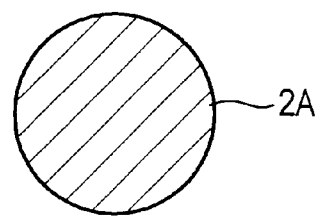

A second embodiment of this invention will be described below with reference to FIG. 2.

The second embodiment uses a key 31 in order to prevent the motion of the stator cores 4 with respect to the case 1 in the first embodiment. In other respect, the second embodiment is the same as the first embodiment. That is to say, in this embodiment, a groove for the key 31 is formed on an inner peripheral face 1A of the case 1 and the distal face of the protrusion 13. The groove on an inner peripheral face 1A and the groove for the distal face of the protrusion 13 are opposed to each other, forming a hole. The motion of the stator cores 4 relative to the case 1 is prevented by insertion of the key 31 into this hole. This embodiment therefore obtains the same effect as the first embodiment.

According to the first and second embodiments of this invention, it is possible to improve radiation of heat to the case and to increase the radiation characteristics from the case. Furthermore processing is facilitated by processing the cooling liquid passage on the outer peripheral face of the stator cores.

Although the invention has been described above by reference to certain embodiment of the invention, the invention is not limited to the embodiment described above.

The method of fixing the stator core 4 and the case 1 is not limited to that described with reference to the first and second embodiments. Any method may be used as long as motion of the stator core 4 and the case 1 is prevented. For example a method using an engagement member such as a pin may be used.

The entire contents of Japanese Patent Applications P2000-353869 (filed Nov. 21, 2000) are incorporated herein by reference.

Modifications and variations of the embodiment described above will occur to those skilled in the art, in light of the above teachings. The scope of the invention is defined with reference to the following claims.

What is claimed is:

1. A rotating electrical machine having a rotor free to rotate about a rotating shaft, a stator comprising a stator core formed by laminating a plurality of magnetic steel plates in a direction parallel with the rotating shaft of the rotor and coils wound on the stator core, and a case storing the stator, the rotating electrical machine comprising:
a plurality of indentations formed on an inner peripheral face of the case;
a plurality of protrusions formed on an outer peripheral face of the stator core, each protrusion projecting towards the case from the outer peripheral face of the stator core and being dovetailed to one of the indentations; and
a cooling liquid passage defined by a section of the outer peripheral face of the stator core which is sandwiched by two adjacent protrusions, and the inner peripheral face of the case, the cooling liquid passage extending substantially parallel to the direction of the rotating shaft;
wherein the stator core is cooled by passing a cooling liquid through the cooling liquid passage.

2. The rotating electrical machine as defined in claim 1, wherein the cooling liquid is oil.

3. The rotating electrical machine as defined in claim 1, wherein the stator comprising a plurality of magnetic steel plates each being dovetailed to the adjacent magnetic steel plates.

4. The rotating electrical machine as defined in claim 1, wherein each magnetic steel plate comprises a first protrusion section formed on a first lateral end and a second protrusion section formed on a second lateral end, each of the protrusion sections being dovetailed to a protrusion section of an adjacent magnetic steel plate, and
wherein each of said plurality of protrusions formed on the outer peripheral face of the stator core comprises a dovetailed protrusion section of adjacent magnetic steel plates.

5. The rotating electrical machine as defined in claim 1, wherein each magnetic steel plate is dovetailed to an adjacent magnetic steel plate, and
wherein contact surfaces among the plurality of magnetic steel plates are located in dovetailed sections which are made up of the plurality of indentations and the plurality of protrusions.

6. A rotating electrical machine, comprising:
a stator core comprised of:
a plurality of plates, said plates being oriented substantially parallel to a rotating shaft of a rotor; and
a plurality of protrusions protruding from an outer peripheral face of said stator core, each of said plurality of protrusions comprising a dovetailed protrusion section of adjacent plates;
a case including a plurality of indentations formed on an inner peripheral face of said case, said case at least partially surrounding said stator core; and
at least one cooling liquid passage formed between two protrusions, said case, and said stator core;
wherein said stator core is substantially fixed to said case by engaging each of said plurality of protrusions with a respective indentation of said plurality of indentations.

7. The rotating electrical machine as defined in claim 6, wherein said stator core is cooled by passing a cooling liquid through said at least one cooling liquid passage.

8. The rotating electrical machine as defined in claim 7, wherein said cooling liquid comprises oil.

9. The rotating electrical machine as defined in claim 6, wherein said plurality of plates comprises a plurality of laminated magnetic steel plates.

10. The rotating electrical machine as defined in claim 6, further comprising coils wound on said stator core.

* * * * *